US006035635A

United States Patent [19]

Hung

[11] Patent Number: 6,035,635

[45] Date of Patent: Mar. 14, 2000

[54] HYDRAULIC QUICK LIFTING UNIT OF A JACK

[76] Inventor: Michael Hung, 9-16, Nan Kan Hsia, Nan Kan, Lu Chu Hsiang, Tao Yuan County, Taiwan

[21] Appl. No.: 09/146,432

[22] Filed: Sep. 3, 1998

[51] Int. Cl.[7] .......... F16D 31/02

[52] U.S. Cl. .......... 60/481; 60/4.79; 91/519

[58] Field of Search .......... 60/477, 479, 481, 60/482; 91/517, 519

[56] References Cited

U.S. PATENT DOCUMENTS

| | | | |
|---|---|---|---|
| 2,398,558 | 4/1946 | Reimuller | 60/481 |
| 2,539,739 | 1/1951 | Grime | 60/481 |
| 3,134,232 | 5/1964 | Barosko | 91/519 |
| 3,581,499 | 6/1971 | Barosko | 60/479 |
| 3,740,952 | 6/1973 | Fujii | 60/481 |
| 3,782,689 | 1/1974 | Barosko | 60/477 |
| 3,890,684 | 6/1975 | Tallman | 60/481 |
| 4,339,942 | 7/1982 | Svensson | 60/479 |
| 4,567,911 | 2/1986 | Kedem | 60/425 |
| 4,641,815 | 2/1987 | Yu | 254/93 H |
| 5,755,099 | 5/1998 | Hung | 60/481 |
| 5,937,647 | 8/1999 | Hung | 60/482 |

FOREIGN PATENT DOCUMENTS

| | | | |
|---|---|---|---|
| 643462 | of 1950 | United Kingdom | 91/517 |

*Primary Examiner*—F. Daniel Lopez
*Attorney, Agent, or Firm*—Wenderoth, Lind & Ponack, L.L.P.

[57] ABSTRACT

The invention relates to an improved hydraulic quick lifting unit used in a jack, especially to improvements made on the valves of the hydraulic system, a fastener assembly and an oil return tube of the lifting shaft. The hydraulic system can return hydraulic liquid to the outer oil reservoir in a slow rate when the lifting shaft according to the invention bears a load. Thus the lifting shaft moves down slowly. When the load on the lifting shaft is removed, the hydraulic liquid flows back to the outer oil reservoir in a larger quantity in a short time. Hence the lifting shaft can quickly return to the its original position. Further, the fastener assembly is located between the lifting shaft and the mandrel, which has the advantages of enhancing the accuracy of the clearance between the mandrel and the inner oil reservoir of the lifting shaft, and preventing the positional shift of the mandrel in the inner oil reservoir. The invention has the benefit of enhancing the stability of product performance.

8 Claims, 7 Drawing Sheets

HYDRAULIC QUICK LIFTING UNIT OF A JACK

BACKGROUND OF THE INVENTION (a) Field of the Invention

The invention relates to an improved hydraulic quick lifting unit used in a jack, especially to improvements made on the valves of the hydraulic system, a fastener assembly and an oil return tube of the lifting shaft. The apparatus according to the invention can provide a high accurate clearance between the lifting shaft and the mandrel and two returning speeds of the lifting shaft depending on its loading.

(b) Description of the Prior Art

Conventional one step hydraulic jacks are operated by starting a pump to drive the lifting shaft from an original position (or the lowest position) to an arbitrary position within the maximum travelling range. U.S. Pat. Nos. 3,581,499, 2,702,988, 4,339,942 and U.S. Pat. No. 5,755,099 have disclosed such apparatuses. The lifting shaft of the above apparatus retracts from the highest position only with a low speed either under a heavy load or without a load on the top of the lifting shaft. However, it is desirable to let the lifting shaft retract at a higher speed as the loading on the shaft is removed. Besides, the apparatus disclosed in U.S. Pat. No. 5,755,099 has such a structure in which there exists a clearance between the mandrel and the inner oil reservoir of the lifting shaft due to the requirement of machining components. The clearance is about 0.4 millimeter. However, there is not any holding means to associate the mandrel with the inner oil reservoir. It is inevitable to shift position after a certain use duration. This will lead to damages of O-rings and back rings and oil leakage. It affects the reliability of product performance very much.

SUMMARY OF THE INVENTION

The primary object of the invention is to provide an improved hydraulic quick lifting unit used in jacks. The improvements according to the invention include the changes made on the hydraulic system and a fastener assembly disposed on the mandrel of the lifting shaft to provide more accurate clearances between the mandrel and the inner oil reservoir of the lifting shaft and to effectively prevent the mandrel in the inner oil reservoir of the lifting shaft from being shifted in position. Further, the invention provides convenience in component machining, keeps oil seals and back rings from being damaged, and promotes the reliability of product performances.

The secondary object of the invention is to provide an improved hydraulic quick lifting unit used in jacks. The change made on the oil return tube according to the invention includes an additional steel ball disposed in the oil return tube. During the lifting shaft is lowered and when the load on it is removed, the disappearance of the loading will move the lower steel ball to open the oil passageway and to let hydraulic liquid rapidly flow into an outer oil reservoir. As a result the lifting shaft can quickly retract. Thus the invention enables the lifting shaft to move in two different speeds depending on its loading. It provides an efficient retraction movement and meets users' requirements.

DETAILED DESCRIPTION OF THE PREFERRED EMBODIMENTS

Figure 1:
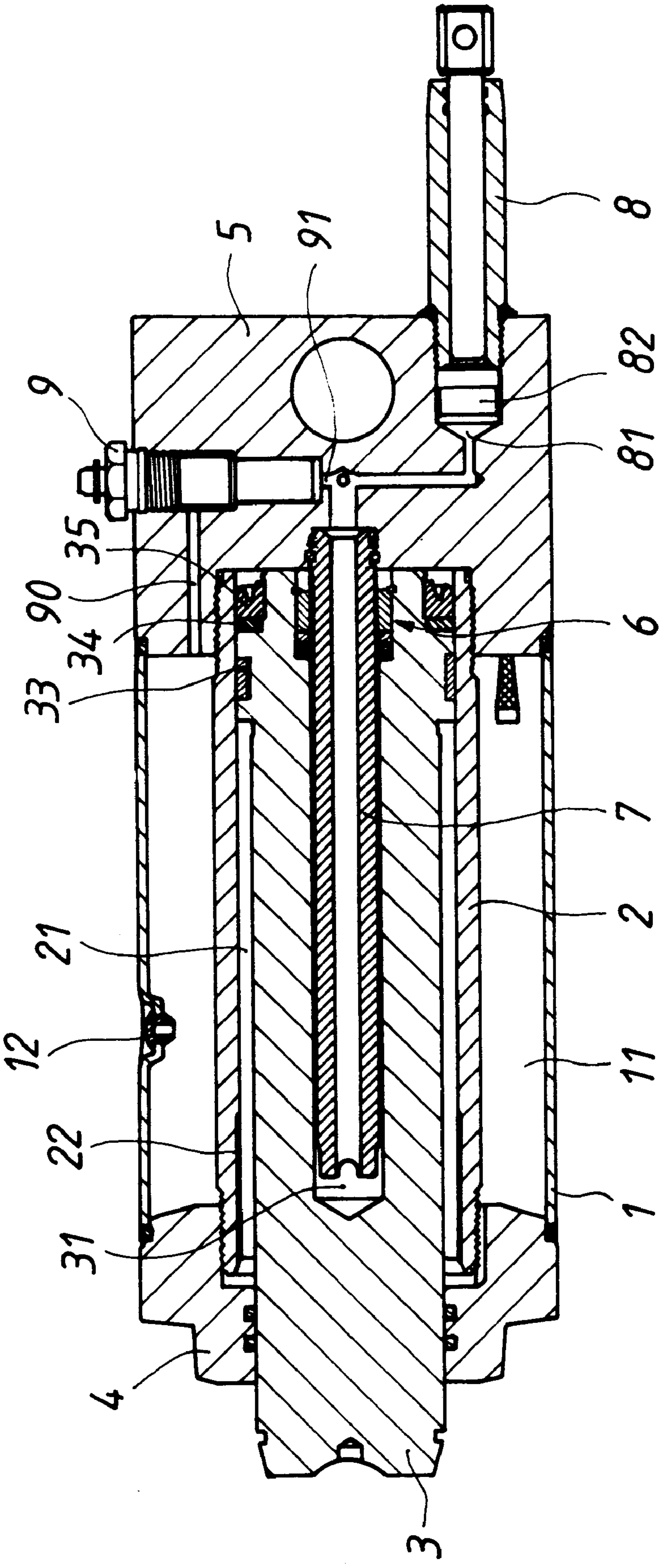
FIG. 1 is a cross sectional assembly drawing showing an embodiment of the quick lifting unit of a jack according to the invention, of which the lifting shaft is in a totally withdrawn state.
Figure 2:
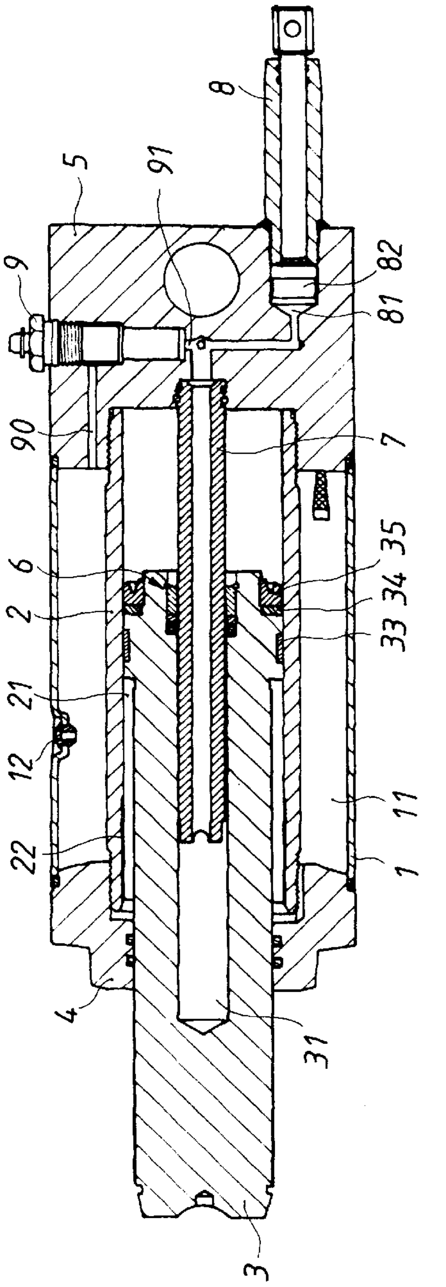
FIG. 2 illustrates the rising movement of the lifting shaft according to the invention.
Figure 3:
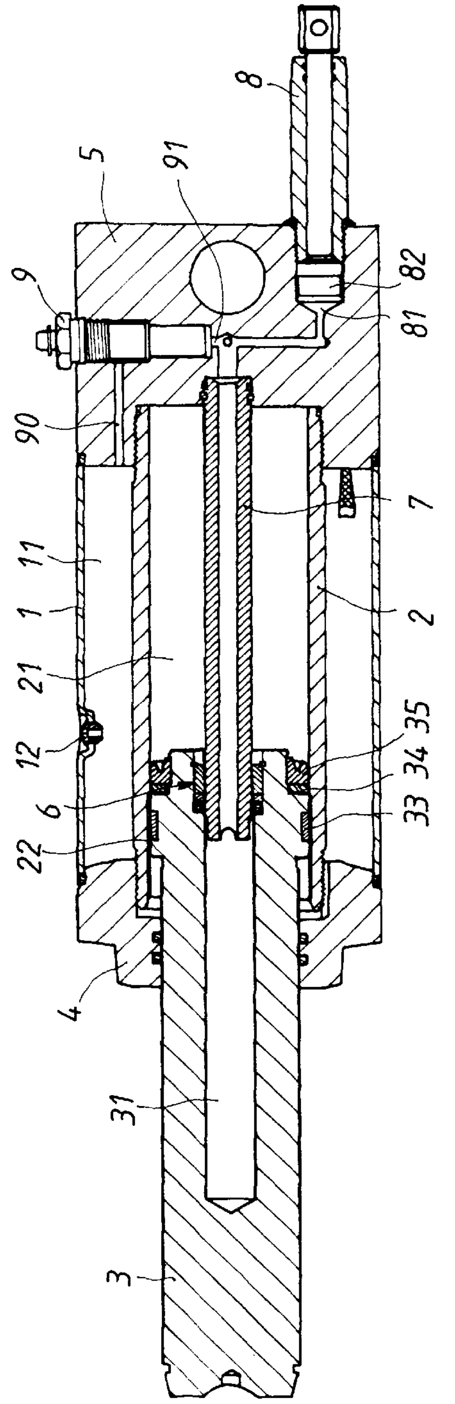
FIG. 3 indicates a state in which the lifting shaft reaches its complete extended position.

As shown in FIGS. 1 through 3, the improved hydraulic quick lifting unit of a jack according to the invention primarily includes an outer hydraulic cylinder body 1, an inner hydraulic cylinder body 2, a lifting shaft 3, a bonnet 4, and a base 5.

The outer hydraulic cylinder body 1 contains an outer oil reservoir 11 filled with hydraulic liquid and is completed with a plug 12 that is inserted into an oil inlet formed on the cylinder wall to close the cylinder body after hydraulic liquid is fed into the oil reservoir 11. The cylinder body is connected at its two ends individually to the bonnet 4 and the base 5.

The inner hydraulic cylinder body 2 is disposed between the bonnet 4 and the base 5 and contains an inner oil reservoir 21 into which a lifting shaft 3 extends. The inner hydraulic cylinder body 2 has an annular groove 22 formed on the inner wall surface near the front end that provides a passage for returning the hydraulic liquid in the inner oil reservoir 21 to the outer oil reservoir 11 in order to avoid bursting the cylinder body when the lifting shaft 3 moves to its farthest position.

Figure 8:
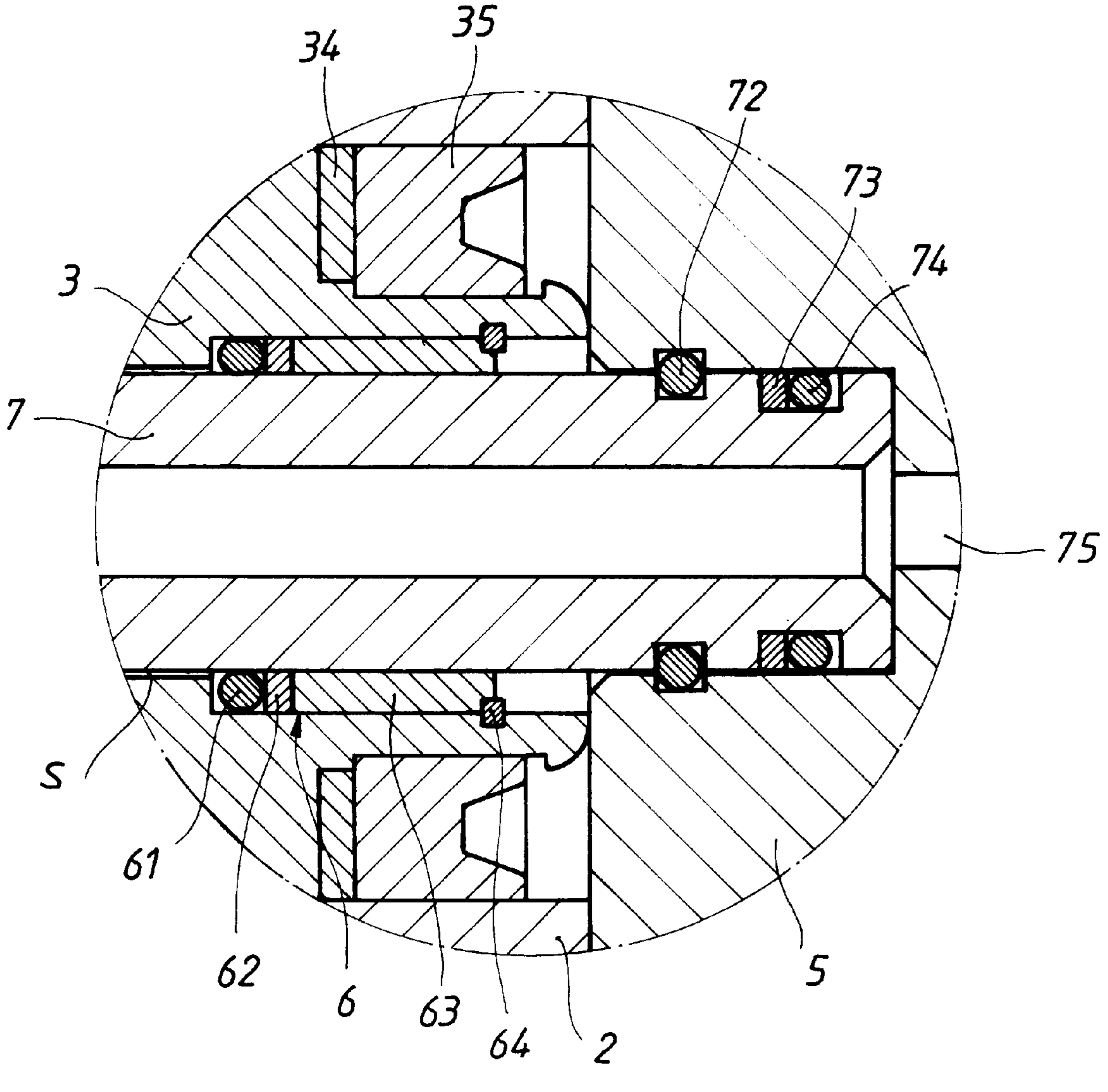
FIG. 8 is a schematic cross sectional view showing a fixing collar according to the invention.

The lifting shaft 3 is designed to raise a heavy weight. The shaft 3 has an inner oil chamber 31 provided therein and a mandrel steadier 33, a back collar 34, and an oil seal 35 disposed around the outer wall surface near the rear end thereof. The hydraulic liquid is sealed inside the inner oil reservoir 21 in a way that allows the longitudinal movement of the lifting shaft 3 in the inner oil reservoir 21. Further, provided inside the inner oil chamber 31 is a mandrel 7 that has a retainer ring 72, a back ring 73, and an oil seal 74 mounted over the outer wall surface near the end to couple with the base 5. A guide and seal assembly 6 is arranged inside a hole at the lower end of the lifting shaft to receive and hold the mandrel 7 in position as shown in FIG. 8. With the arrangement of the guide and seal assembly 6 the mandrel 7 can get maximum guidance. The outlet of the inner oil chamber 31 is in communication with the oil chamber 81 of a pump 8.

The bonnet 4 is disposed at the front end of the jack to guide the lifting shaft 3 when the lifting shaft is driven by a hydraulic system to move along a straight line.

Figure 4:
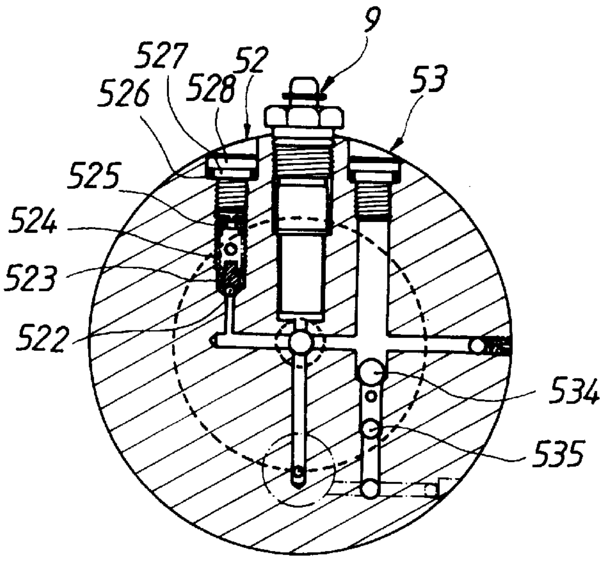
FIG. 4 is a cross sectional schematic view depicting the hydraulic passage of the quick lifting unit according to the invention.
Figure 5:
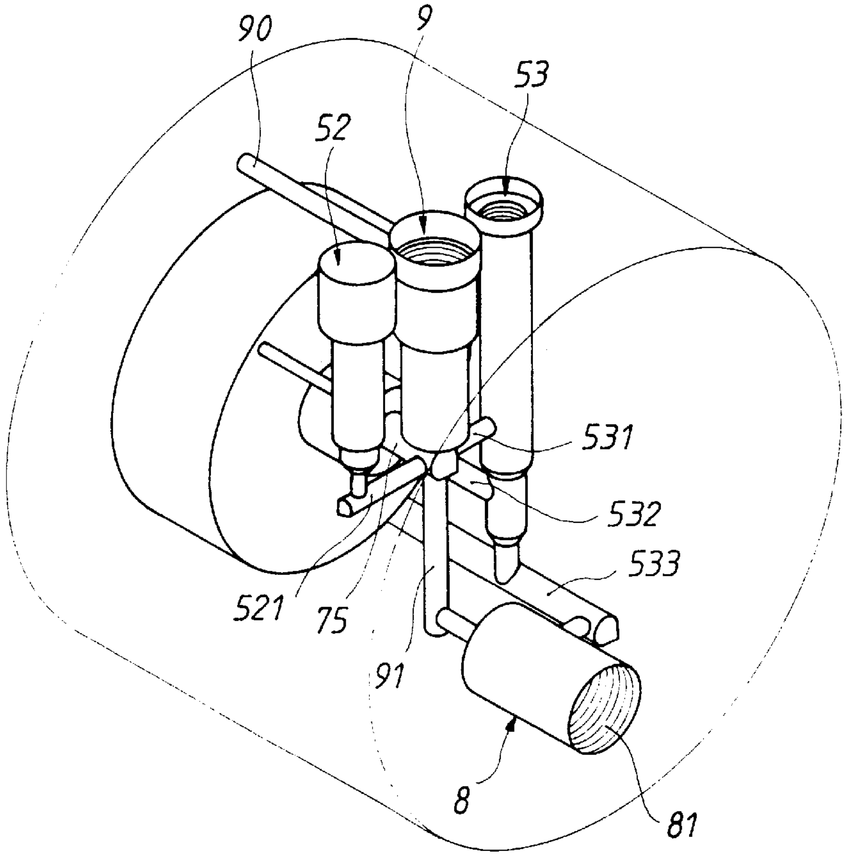
FIG. 5 is a schematic view showing the construction of the hydraulic system of the invention.

The base 5 is at the bottom of the jack and has a pump 8 and an oil return tube 9 respectively provided on the sides thereof. The pump 8 has an oil chamber 81 inside which there is provided a unidirectional valve 82. One end of the oil return tube 9 is connected to the outer oil reservoir 11 through an oil passage 90 as shown in FIGS. 4 and 5. The other end of the oil return tube 9 is connected by an oil passage 91 to the oil chamber 81 of the pump 8 and the oil passage 75 of the mandrel 7. Besides, the oil passage 91 is in communication at its two ends respectively with the oil passage 521 of a modulation valve 52 and the oil passage 531 of an equilibrium valve 53. The equilibrium valve 53 is equipped at its lower end with an upper oil passage 532 and a lower oil passage 533, the upper oil passage being connected to the inner oil reservoir 21 and the lower oil passage connected to the outer oil reservoir 11. A steel ball 535 is disposed between the upper and the lower oil passage 532, 533. Likewise another steel ball 534 is seated between the upper oil passage 532 and the aforesaid oil passage 531. The lower oil passage 533 is in communication with the oil chamber 81 of the pump 8.

As can be seen from FIG. 4, in the hydraulic pipes, there is a steel ball 522 provided inside the modulation valve 52. A stopper 523 and a spring 524 are arranged on the steel ball 522 and secured in position by an adjusting screw 525. Above the adjusting screw 525 are an O-ring 526, a high pressure washer 527, and a safe bolt 528. Turning the adjusting screw 525 can regulate the pressure value of keeping the steel ball 522 in position.

The equilibrium valve 53 is designed to control and to regulate the flow of hydraulic liquid while to balance the pressure difference between the outer oil reservoir 11, the inner oil reservoir 21, and the oil chamber 31 of the lifting shaft 3 so that the lifting shaft can quickly rise.

Figure 6:
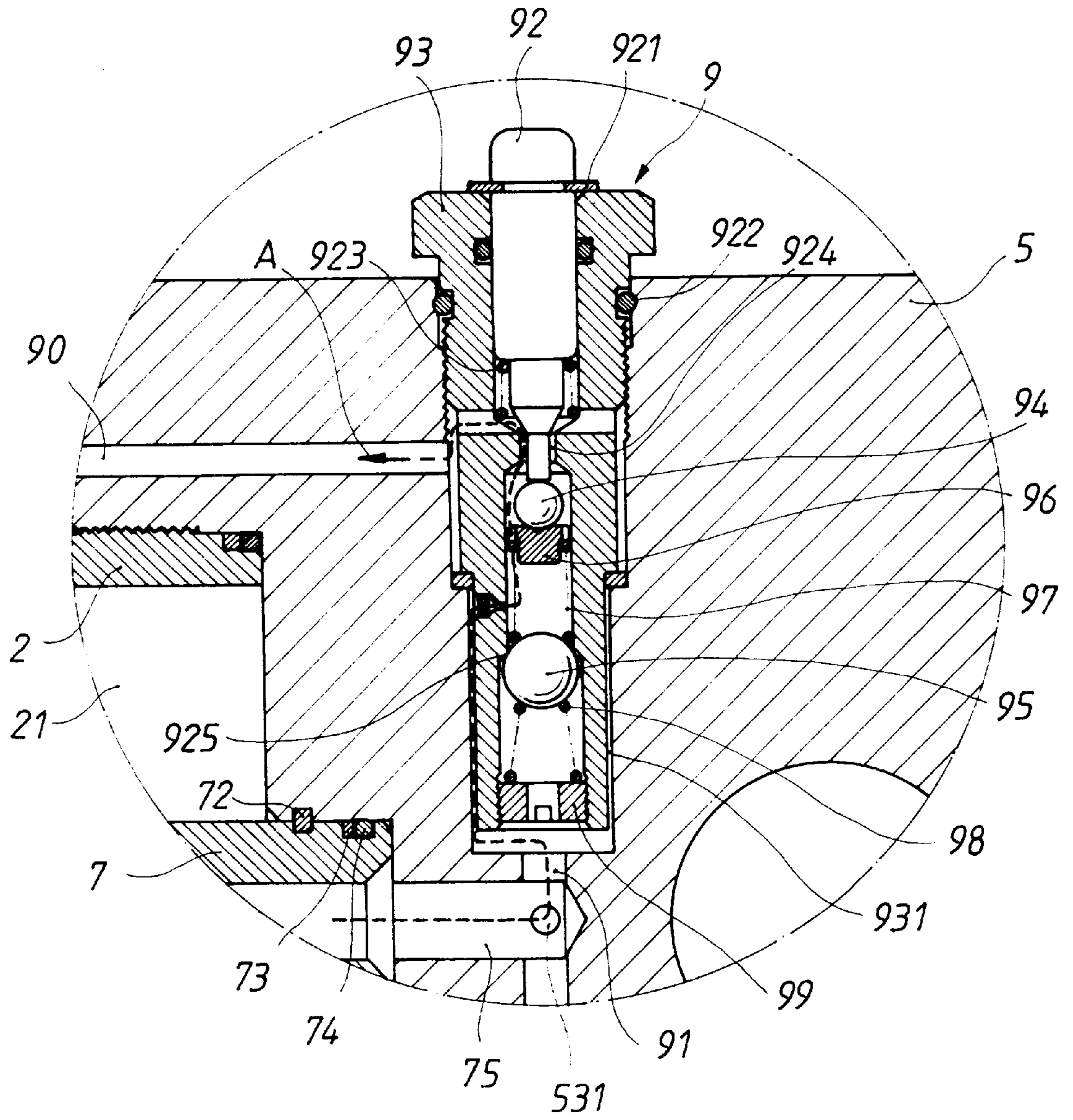
FIG. 6 is a schematic cross sectional view showing the oil return tube according to the invention in a state that the oil channel of the oil return tube is closed by the lower steel ball.
Figure 7:
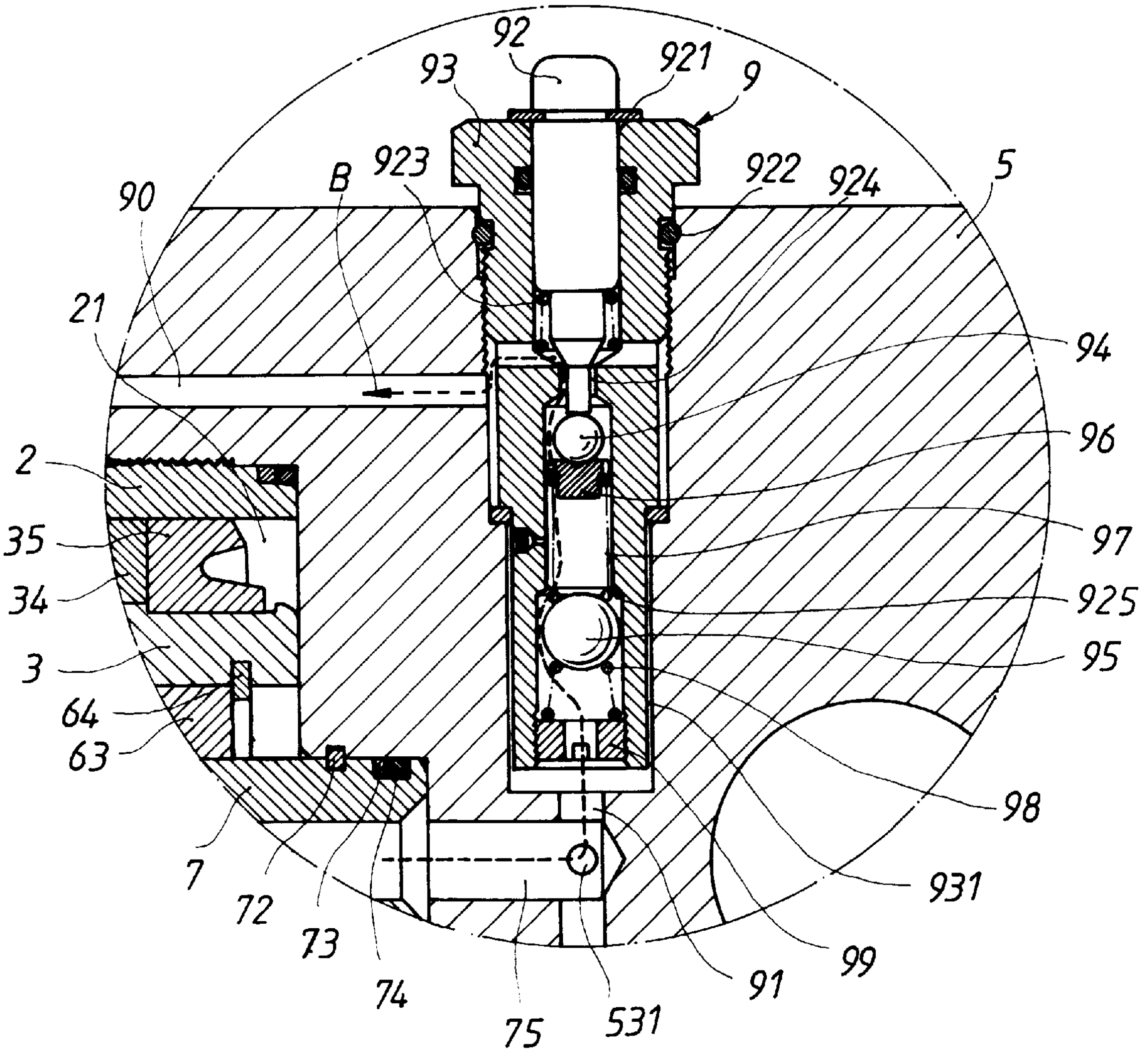
FIG. 7 is another schematic view showing the oil return tube in a state that the oil channel of the tube is open.

The oil return tube 9, as shown in FIGS. 6 and 7, is composed of an oil return rod 92, a tube body 93, an upper and a lower steel ball 94 and 95. The oil return rod 92 has a C-type retainer ring 921 and an oil seal 922 mounted thereon and a spring 923 disposed on the lower portion thereof. The spring 923 urges the oil return rod 92 upwardly to keep it apart from the upper steel ball 94 and thus a cylindrical compression spring 97 can hold the upper steel ball 94 against the upper valve aperture 924. The upper and the lower steel ball 94, 95 are serially connected by a stopper 96 and a cylindrical compression spring 97 disposed therebetween. Further, a conical compression spring 98 is placed under the lower steel ball 95 to press it against the valve aperture 925.

Disposed under the bottom of the conical compression spring 98 is an adjusting screw 99, by which the pressure value of the springs can be regulated. The lower oil passage 91 of the return tube 9 is in communication with the oil chamber 81 of the pump 8 and the oil passage 75 of the mandrel 7. However, a small annular clearance 931 is designed to exist between the outer wall of the lower portion of the tube body 93 and the inner wall of the hole that receives the tube body. When the lower steel ball 95 obstructs the valve aperture 925, hydraulic liquid can pass through the oil passage 75 of the mandrel 7 and the annular clearance 931 and then get by the upper valve aperture 924 in a way of slow release. Finally hydraulic liquid returns to the outer oil reservoir 11 along the route indicated by the arrowhead A in FIG. 6. When the valve aperture 925 opens as shown in FIG. 7, hydraulic liquid will flow along the oil passage 75 of the mandrel 7 and pass through the lower valve aperture 925 and the upper valve aperture 924 in a large quantity during a short period and eventually returns to the outer oil reservoir along the direction indicated by the arrowhead B in FIG. 7.

With the hydraulic system of the invention, the lifting shaft can be quickly raised by starting the pump 8 to direct hydraulic liquid from the outer oil reservoir 11 to the oil chamber 81 of the pump 8. As a result the interior of the mandrel 7 is rapidly filled with hydraulic liquid and brings the lifting shaft 3 to a standby position of raising a weight. At that moment, continually running of the pump 8 urge the steel ball 522 of the modulation valve 52 to move away from its position and open the passage. Thus hydraulic liquid enters the inner oil reservoir 21. Consequently the lifting shaft 3 begins to move upwardly to raise a weight. On the other hand, during an exhaustion of hydraulic liquid from the inner oil reservoir hydraulic liquid gradually flows into the outer oil reservoir through the oil passage 75 of the mandrel 7 and the annular clearance 931 with a very small flow rate until the separation of the lifting shaft 3 from the weight it bears. As the load on the lifting shaft 3 disappears, the force of the cylindrical compression spring 97 becomes larger than that of the conical compression spring 98. Hence the lower steel ball 95 is forced to back and thus the oil passage is open. As a consequence, hydraulic liquid can quickly flow back to the outer oil reservoir to bring the lifting shaft to return to its original position.

As shown in FIG. 8, the guide and seal assembly 6 embraces around the mandrel 7 at a position near the lower end of the lifting shaft 3 where the lifting shaft 3 supports the mandrel 7. The guide and seal assembly 6 comprises in sequence an oil seal 61, a back ring 62, a bush 63, and a retainer ring 64. The mandrel 7 is located by the lifting shaft 3. If S is the clearance between the mandrel 7 and the lifting shaft 3 caused by machining, it is the sum of the clearances between the bush 63 and the mandrel 7, and between the bush and the lifting shaft 3. The presence of the bush 63 can keep the fit clearance S from being varied due to a shifted mandrel 7. The variation in clearance could lead to the damage of oil seals and back rings. Besides, the presence of the bush also makes the machining accuracy of related components controlled in an easier way and enhances the reliability of product performances.

Figure 9:
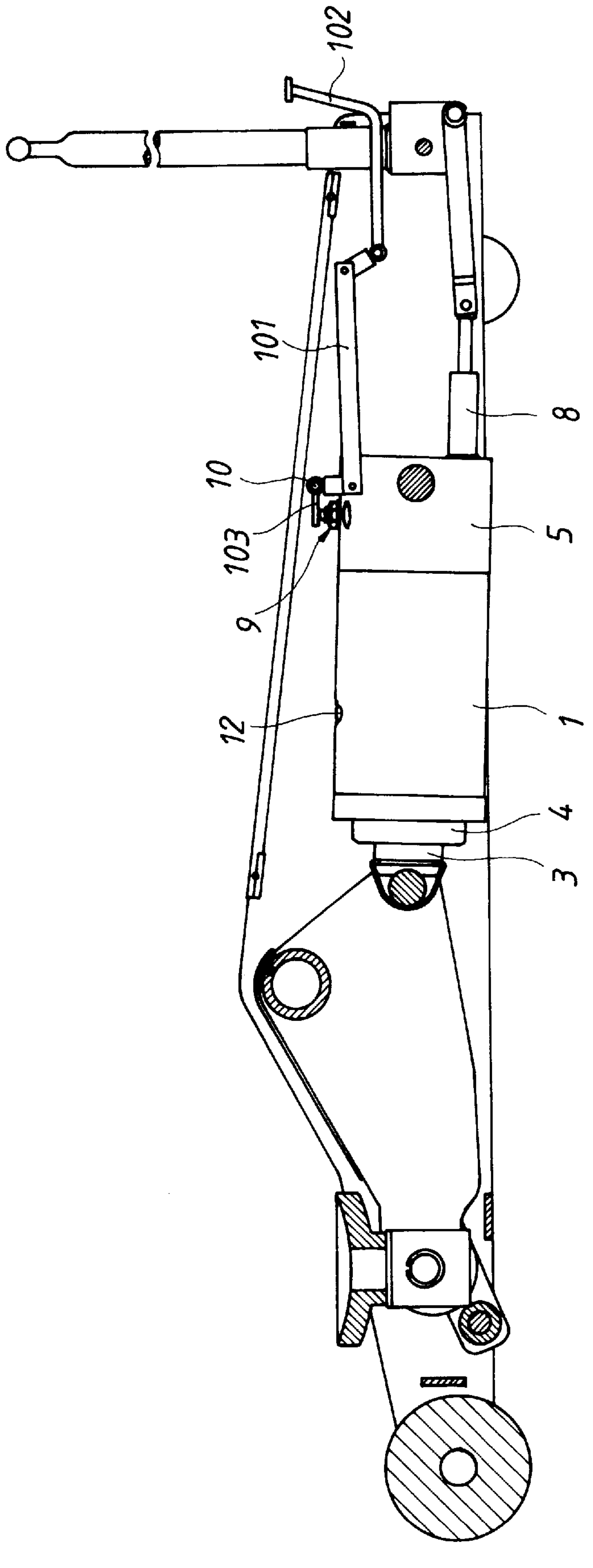
FIG. 9 is a schematic view of a jack assembly according to the invention.

Further, FIG. 9 illustrates the driving method of the oil return rod 92 of the oil return tube 9. The oil return rod 92 has an offset rod 10 provided at one side. The offset rod 10 is further connected to a link rod 101 and a pedal 102 in a way that depressing the pedal 102 moves a holding-down plate 103 coupled with the offset rod 10 to urge the oil return rod 92.

What is claimed is:

1. An improved hydraulic quick lifting unit used in a jack comprising an outer hydraulic cylinder body, an inner hydraulic cylinder body, a lifting shaft, a bonnet, and a base;

wherein said outer hydraulic cylinder body is connected at its two ends individually to the bonnet and the base, and contains an outer oil reservoir filled with hydraulic liquid and is completed with a plug 12 that is inserted into an oil inlet formed on the cylinder wall to close the cylinder body after hydraulic liquid is fed into the outer oil reservoir;

said inner hydraulic cylinder body, being disposed between the bonnet and the base, includes an inner oil reservoir into which a lifting shaft extends and has an annular groove formed on the inner wall surface near the front end that provides a passage for returning the hydraulic liquid in the inner oil reservoir to the outer oil reservoir when the lifting shaft moves to its farthest position;

said lifting shaft has an inner oil chamber formed therein, provided inside which inner oil chamber is a mandrel that is associated to the base by means of a retainer ring disposed at the end of the mandrel and a guide assembly arranged inside a hole at the lower end of the lifting shaft to receive and guide the mandrel in position, said inner oil chamber having an outlet communicated with an oil chamber of a pump, through an oil passage of the mandrel;

the bonnet is disposed at the front end of the jack to guide the lifting shaft when the lifting shaft is driven by a hydraulic system to move up and down;

the base is at the bottom of the jack and has the pump and an oil return tube respectively provided on the sides thereof; a unidirectional valve provided in the oil chamber of said pump, said oil return tube being at one end connected to the outer oil reservoir through first oil passage and at the other end thereof connected to the oil chamber of the pump and the oil passage of the mandrel via a second oil passage that is in communication at its two ends respectively with a third oil passage of a modulation valve and a fourth oil passage of an equilibrium valve, said equilibrium valve being equipped at its lower end with an upper oil passage and a lower oil passage, with the upper oil passage connected to the inner oil reservoir and the lower oil passage connected to the outer oil reservoir, said equilibrium valve being further provided with a steel ball between the upper and the lower oil passage, and another steel ball between the upper oil passage and the second oil passage thereof, and said lower oil passage being in communication with the oil chamber of the pump.

2. An improved hydraulic quick lifting unit as claimed in claim 1, of which the guide assembly includes a mandrel steadier, a back collar, and an oil seal disposed in sequence on the rear end of the lifting shaft, to seal hydraulic liquid therein.

3. An improved hydraulic quick lifting unit as claimed in claim 1, in which the mandrel has the retainer ring, a back ring, and an oil seal mounted over the outer wall surface near the end to couple with the base.

4. An improved hydraulic quick lifting unit as claimed in claim 1, in which the modulation valve of the hydraulic system has a steel ball provided inside the modulation valve, and a stopper and a spring arranged above the steel ball and held in position by an adjusting screw, said modulation valve further having an O-ring, a high pressure washer, and a safe bolt disposed above said adjusting screw, and the pressure value of keeping the steel ball in position being able to be adjusted by turning the adjusting screw.

5. An improved hydraulic quick lifting unit as claimed in claim 1, in which the oil return tube is composed of an oil return rod, a tube body, an upper and a lower steel ball, said oil return rod having a spring disposed on the lower portion thereof to hold the upper steel ball against the upper valve aperture, said upper and said lower steel ball separately pressing against lower valve apertures, with a stopper, a cylindrical compression spring, and a conical compression spring disposed therebetween in a serial manner and a screw arranged under the conical compression to provide the adjustment means of the spring forces, by means of proper adjustment of spring forces the lower oil passage of the return tube being in communication with the oil chamber of the pump and the oil passage of the mandrel.

6. An improved hydraulic quick lifting unit as claimed in claim 5, in which there exists a small annular clearance between the outer wall of the lower portion of the tube body and the inner wall of the hole that receives the tube body so that when the lower steel ball obstructs the valve aperture hydraulic liquid can pass through the oil passage of the mandrel and the annular clearance and then get by the upper valve aperture with a slow flow rate.

7. An improved hydraulic quick lifting unit as claimed in claim 1, in which the guide assembly comprises in sequence an oil seal, a back ring, a bush, and a retainer ring, wherein the bush stably locates and positively guides the mandrel.

8. An improved hydraulic quick lifting unit as claimed in claim 5, in which the oil return rod has an offset rod provided at one side, which is connected to a link rod and a pedal in a way that depressing the pedal moves a holding-down plate coupled with the offset rod to move the oil return rod.

* * * * *